(12) United States Patent
Kelley et al.

(10) Patent No.: US 6,303,058 B1
(45) Date of Patent: Oct. 16, 2001

(54) METHOD OF MAKING PROFILED RETROREFLECTIVE MARKING MATERIAL

(75) Inventors: Michele H. Kelley, St. Paul; Terry Bailey; Bruce B. Wilson, both of Woodbury; John W. Frank, Cottage Grove; Dave G. Schueler, Forest Lake; Thanh-Huong Thi Nguyen, Oakdale, all of MN (US); Naoki Nakayama, Tendo (JP); Larry K. Stump; Dale H. Haunschild, both of Hudson, WI (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 09/183,831

(22) Filed: Oct. 30, 1998

Related U.S. Application Data

(63) Continuation-in-part of application No. 08/672,143, filed on Jun. 27, 1996, now abandoned.

(51) Int. Cl.[7] .................................................. B29D 11/00
(52) U.S. Cl. ........................... 264/1.38; 264/1.9; 264/2.7; 264/571; 264/DIG. 78
(58) Field of Search ............................... 264/1.1, 1.9, 1.7, 264/2.7, 1.36, 1.38, 571, DIG. 78

(56) References Cited

U.S. PATENT DOCUMENTS

| | | |
|---|---|---|
| 1,773,111 | 8/1930 | Miller, Jr. . |
| 2,294,930 | 9/1942 | Palmquist ................................ 88/82 |
| 2,897,733 | 8/1959 | Shuger . |

(List continued on next page.)

FOREIGN PATENT DOCUMENTS

| | | | |
|---|---|---|---|
| 6656/65 | 2/1968 | (CH) | ............................ G04B/11/00 |
| 94 01 987.8 | 4/1994 | (DE) . | |
| 443 34 659 | 4/1995 | (DE) . | |
| 0 373 826 A3 | 6/1990 | (EP) | ................................ E01F/9/08 |
| 0 381 886 A1 | 8/1990 | (EP) | ................................ E01F/9/08 |
| 0385746 | 11/1992 | (EP) . | |
| 835349 | 9/1999 | (EP) . | |
| 2 557 896 | 7/1985 | (FR) | ................................ E01C/23/16 |
| 0 541 624 | 3/1979 | (GB) | ............................... G09F/13/16 |
| 1 541 624 | 3/1979 | (GB) | ............................... G09F/13/16 |
| 8-27743 | 1/1996 | (JP) | ................................. E01F/9/04 |
| WO 93/21388 | 10/1993 | (WO) . | |
| WO 95/08426 | 3/1995 | (WO) | ............................ B29C/37/00 |
| WO97/01677 | 1/1997 | (WO) . | |
| WO97/01679 | 1/1997 | (WO) . | |
| WO99/04096 | 1/1999 | (WO) . | |
| WO99/04099 | 1/1999 | (WO) . | |

OTHER PUBLICATIONS

ASTM E97–77.
ASTM E303.

*Primary Examiner*—Mathieu D. Vargot
(74) *Attorney, Agent, or Firm*—Rudolph P. Hofmann, Jr.

(57) ABSTRACT

A method of making a retroreflective article comprising on the top surface thereof a retroreflective sheet that comprises a monolayer of retroreflective elements wherein first portions of the monolayer are arranged in a contoured profile and second portions of the monolayer are arranged a substantially planar position.

17 Claims, 2 Drawing Sheets

U.S. PATENT DOCUMENTS

| | | | |
|---|---|---|---|
| 2,948,191 | 8/1960 | Hodgson, Jr. et al. | 88/82 |
| 3,106,878 | 10/1963 | Nagin et al. | 94/1.5 |
| 3,172,942 | 3/1965 | Berg | 88/82 |
| 3,311,441 | 3/1967 | Gill, Jr. | 350/105 |
| 3,334,554 | 8/1967 | Adams | 94/1.5 |
| 3,746,425 | 7/1973 | Eigenmann | 350/109 |
| 3,785,719 | 1/1974 | Jonnes | 350/105 |
| 3,920,346 | 11/1975 | Wyckoff . | |
| 4,025,159 | 5/1977 | McGrath . | |
| 4,025,195 | 5/1977 | Ebersole et al. | 356/71 |
| 4,035,059 | 7/1977 | DeMaster | 350/105 |
| 4,040,760 | 8/1977 | Wyckoff . | |
| 4,072,403 | 2/1978 | Eigenmann . | |
| 4,123,140 | 10/1978 | Ryan et al. | 350/105 |
| 4,145,112 | 3/1979 | Crone et al. . | |
| 4,146,635 | 3/1979 | Eigenmann | 428/283 |
| 4,235,512 | 11/1980 | Brasfield et al. | 350/105 |
| 4,236,788 | 12/1980 | Wyckoff . | |
| 4,249,832 | 2/1981 | Schmanski | 404/6 |
| 4,299,874 | 11/1981 | Jones et al. | 428/143 |
| 4,345,023 | 8/1982 | Wyckoff | 430/364 |
| 4,388,359 | 6/1983 | Ethen et al. | 428/143 |
| 4,411,553 | 10/1983 | Eigenmann | 404/16 |
| 4,443,510 | 4/1984 | Watt | 428/149 |
| 4,505,967 | 3/1985 | Bailey | 428/164 |
| 4,564,556 | 1/1986 | Lange | 428/325 |
| 4,648,689 | 3/1987 | May | 350/105 |
| 4,648,932 | 3/1987 | Bailey | 156/276 |
| 4,653,854 | 3/1987 | Miyata | 350/105 |
| 4,664,966 | 5/1987 | Bailey et al. | 428/203 |
| 4,681,401 | 7/1987 | Wyckoff . | |
| 4,712,867 | 12/1987 | Malek . | |
| 4,712,868 | 12/1987 | Tung et al. | 350/105 |
| 4,751,140 | 6/1988 | Ishihara | 428/324 |
| 4,856,931 | 8/1989 | Bollag | 404/75 |
| 4,875,798 | 10/1989 | May . | |
| 4,875,799 | 10/1989 | Harrison | 404/12 |
| 4,876,141 | 10/1989 | Kobayashi et al. | 428/217 |
| 4,921,754 | 5/1990 | Ishihara | 428/325 |
| 4,950,525 | 8/1990 | Bailey | 428/164 |
| 4,965,097 | 10/1990 | Bach | 428/194 |
| 4,983,458 | 1/1991 | Dejaiffe | 428/402 |
| 4,988,541 | 1/1991 | Hedblom | 427/163 |
| 4,988,555 | 1/1991 | Hedblom | 428/172 |
| 5,077,117 | 12/1991 | Harper et al. | 428/143 |
| 5,087,148 | 2/1992 | Wyckoff | 404/12 |
| 5,108,218 | 4/1992 | Wyckoff | 404/14 |
| 5,127,973 | 7/1992 | Sengupta et al. . | |
| 5,139,590 | 8/1992 | Wyckoff | 156/71 |
| 5,227,221 | 7/1993 | Hedblom | 428/172 |
| 5,242,242 | 9/1993 | Young | 404/12 |
| 5,257,491 | 11/1993 | Rouyer et al. . | |
| 5,268,789 | 12/1993 | Bradshaw . | |
| 5,277,513 | 1/1994 | Flanagan . | |
| 5,310,278 | 5/1994 | Kaczmarczik et al. | 404/14 |
| 5,316,406 | 5/1994 | Wyckoff | 404/12 |
| 5,340,231 | 8/1994 | Steere et al. . | |
| 5,417,515 | 5/1995 | Hackey et al. | 404/15 |
| 5,450,235 | 9/1995 | Smith et al. . | |
| 5,453,320 | 9/1995 | Harper et al. | 428/356 |
| 5,536,569 | 7/1996 | Lasch et al. | 428/328 |
| 5,539,033 | 7/1996 | Bredahl et al. . | |
| 5,550,175 | 8/1996 | Bredahl et al. . | |
| 5,593,246 | 1/1997 | Hedblom et al. | 404/9 |
| 5,605,761 | 2/1997 | Burns et al. . | |
| 5,642,962 | 7/1997 | Marcato | 404/94 |
| 5,676,488 | 10/1997 | Hedblom | 404/9 |
| 5,677,050 | 10/1997 | Bilkadi et al. . | |
| 5,679,437 | 10/1997 | Hackworth et al. | 428/143 |
| 5,691,846 | 11/1997 | Benson, Jr. et al. . | |
| 5,691,847 | 11/1997 | Chen | 359/565 |
| 5,706,132 | 1/1998 | Nestegaard et al. . | |
| 5,763,049 * | 6/1998 | Frey et al. | 264/1.9 |
| 5,774,265 | 6/1998 | Mathers et al. . | |
| 5,837,350 | 11/1998 | Jacobs | 428/195 |

* cited by examiner

METHOD OF MAKING PROFILED RETROREFLECTIVE MARKING MATERIAL

CROSS-REFERENCE TO RELATED APPLICATIONS

This application is a continuation-in-part of U.S. application Ser. No. 08/672,143, entitled Wet Retroreflective Marking Material, filed on Jun. 27, 1996, now abandoned.

FIELD OF INVENTION

The present invention relates to methods of making profiled retroreflective articles having a retroreflective base sheet formed to have first portions arranged in an upwardly contoured profile and second portions in a substantially planar position.

BACKGROUND

Retroreflective articles have the ability to redirect substantial quantities of incident light, which otherwise would be reflected elsewhere, back towards the incident light source. This ability has led to widespread use of retroreflective articles in a variety of applications relating to traffic safety. Retroreflective sheetings are particularly useful to guide motorists under poor lighting conditions, such as, for example, under nighttime driving or under inclement weather. Examples of uses of retroreflective sheeting include, but are not limited to traffic signs, cones, and barricades.

Some skilled in the art have developed various methods of making profiled retroreflective articles using retroreflective base sheets. By "profiled," it is meant that some portion of the retroreflective base sheet is elevated from the body of the article so as to create a vertical component.

For example, Assignee's pending U.S. patent application Ser. No. 08/895,384, filed on Jul. 16, 1997, discloses a retroreflective sheeting that has a continuous, longitudinal extending retroreflective portion and pleated retroreflective portions. Each pleated portion extends generally perpendicular to and is spaced along the longitudinal portions. As defined in the application, "pleated" means that a portion of the sheeting is doubled upon itself and bonded together by, for example, an adhesive or ultrasonic bonding. The pleats elevate a portion of the retroreflective sheet so that incident light at high entrance angles strikes the pleated portion and is retroreflected by the pleated portion. The sheeting is very useful for application on traffic barricades, such as jersey barriers or guard railings.

Publication No. WO 93/21388 discloses a method and device for producing light-reflecting surfaces, particularly for road markings. The markings have ridge-like stripes containing reflecting components, the stripes applied perpendicularly or at an angle to the traffic direction. The marking can be applied directly onto a road surface or prefabricated onto a carrier web and applied to a road surface. When a marker is made directly on the road, the method includes applying a thin coating onto a road surface, applying ridge-like profile markings across the longitudinal direction of the coating, applying light reflecting materials, such as glass beads, into the surfaces of the coating and ridge-like material while the surfaces are still soft to yield a pavement marking.

A need exists for streamlined methods to make profiled retroreflective articles for use in vertical or horizontal applications.

SUMMARY OF INVENTION

The present invention provides methods of making articles using retroreflective base sheets and a novel approach of elevating portions of the base sheet. The inventive articles exhibit surprisingly effective retroreflective properties, especially at very high entrance angles (e.g., 85° or more) as well as at low entrance angles. They are well suited for use on vertical and horizontal surfaces.

In brief summary, a method of the invention comprises: (a) providing a substantially continuous, longitudinally extending retroreflective base sheet comprising a cover layer and a plurality of retroreflective elements, the base sheet having a retroreflective top surface and a bottom surface; (b) creating a plurality of cavities on the bottom surface of the base sheet without substantially stretching it to yield (i) first portions extending generally perpendicular to the base sheet, the first portions having retroreflective elements arranged in an upwardly contoured profile, and (ii) second portions having retroreflective elements arranged in a substantially planar position; and (c) applying a filling material into the cavities to retain the first portions.

Typically the inventive methods generates a plurality of first portions and second portions in a continuous sheet. Base sheets can be cube-corner based or microsphere based and are typically provided in a substantially continuous, longitudinally extending form, such as, for example, in a roll. The base sheet can be an enclosed-lens or an exposed-lens sheet. An advantage of using an enclosed-lens retroreflective sheet is that the resultant article is inherently wet retroreflective. That is, the inventive article will retroreflect under wet conditions, occurring, for example, during rainy conditions, during conditions when the rain has subsided but the article has not yet dried, or during the early morning hours when dew has collected on the inventive article. Some enclosed-lens base sheets are flexible and many can be made in desired colors. They are low profile and conform to road surfaces. They are resistant to damage from traffic and withstand exposure to water, salt, oils, ultraviolet radiation, sand abrasion, high temperatures, making them well suited for use on road surfaces. An enclosed-lens base sheet typically exhibits higher retroreflective performance compared to an exposed-lens base sheet using diffuse reflectors in the environments stated above.

The inventive methods produce articles that are particularly well suited for applications where incident light strikes at entrance angles greater than about 85°. In this document, "entrance angle" has the same definition as that defined in the United States Federal Test Method 370. In general, two axes define the entrance angle. The first axis is an axis of incident light, which is a line along which incident light travels from a light source to an indicia mark on a retroreflective base sheet. The second axis is a reference axis, which is a line perpendicular to the plane of the sheet extending from the indicia mark. Entrance angles range from −90° to 0° to +90°. A 0° entrance angle occurs when the reference axis is superimposed on the axis of incident light. This situation is typically termed as "head on" because the light source is nearly perpendicular to the sample at the indicia mark. An entrance angle of 85° and above is referred to as a "high entrance angle."

High entrance angle applications include pavement markings and applications where the incident light may be from any direction, such as horizontal signs. Illustrative examples of such horizontal signs include the legends and symbols commonly placed on pavement in parking lots to denote handicapped parking, and the arrows and lane markings placed on the pavement at an intersection.

In addition, retroreflective articles of the invention are also well suited for use on vertical surfaces, particularly those that are observed at high entrance angles, such as, but not limited to, guard rails, building walls along alleys, Jersey barriers, bridge abutments, posts, and traffic barrels. An advantage of inventive articles is that they also have the ability to retroreflect incident light nearly the full spectrum of entrance angles. This ability makes the inventive article especially well suited for use on walls and barriers along highways and other applications where a vehicle may approach the structure from a wide range of angles at which effective retroreflective brightness is desired. The inventive articles can be used on curved substrates, e.g., wrapped around traffic cones and barrels, and on curved guardrails, providing excellent retroreflective brightness along essentially the entire visible portion of the substrate.

DEFINITIONS

As used in this document:

"base sheet" is a substantially continuous, longitudinally extending retroreflective sheeting having (a) a top retroreflective surface and a bottom surface, and (b) a cover layer and a plurality of retroreflective elements in the form of cube-corner elements, optionally having a specular reflector on the cube-corner elements faces, or in the form of microspheres with a reflector in optical association with the microspheres;

"cavities" mean hollow areas that correspond to the first portions and are formed on the base sheet's bottom surface;

"enclosed-lens" base sheet comprises (a) a plurality of retroreflective elements and (b) a cover layer on the front surface of the elements where incident light enters, and includes encapsulated-lens and embedded-lens base sheets;

"filling material" includes any material capable of being applied to the cavities to fill them so as to preserve their shape creating corresponding first portions;

"first portions" are regions in the base sheet where the retroreflective elements are elevated so as to be generally perpendicular or at an angle to the longitudinal direction of the base sheet;

"gathering" means forming cavities in the retroreflective base sheet without substantially stretching the base sheet;

"land" means that portion of the filling material that lies behind the base sheet's first and second portions;

"second portions" are regions in the base sheet that has not been elevated and are typically parallel to the substrate the inventive article is applied;

"substantially planar" means parallel with the substrate to which the inventive article is applied and is a characteristic of the second portions;

"upwardly contoured" means generally perpendicular to the plane of the base sheet and does not imply vertical orientation; and "without substantially stretching" means minimal, i.e., less than about 10% elongation of the base sheet.

BRIEF DESCRIPTION OF THE DRAWINGS

The invention will be further explained with reference to the drawings, wherein.

These figures, which are idealized, are not to scale, and are intended to be merely illustrative and non-limiting.

DETAILED DESCRIPTION OF ILLUSTRATIVE EMBODIMENTS

Figure 1:
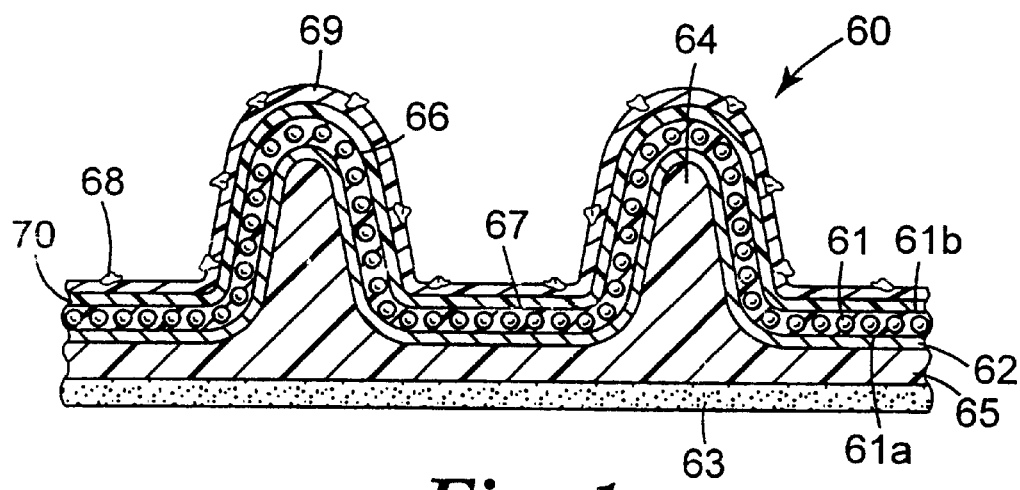
FIG. 1 is a cross section an illustrative article of the invention.

FIG. 1 shows a cross section of an illustrative inventive article 60 having a retroreflective base sheet 61. On the bottom surface 61a of sheet 61 is an optional adhesive layer (not shown) to which an optional conformance layer 62 is attached. A filling material 64 is disposed next to the conformance layer and optional adhesive layer 63 can be used for direct attachment of the article 60 to a substrate, such as, e.g., a jersey barrier or a pavement marker. The filling material is preferably a polymeric material. The article 60 has upwardly contoured, elevated, and profiled first portions 66 and second portions 67 which are substantially planar and typically parallel to a substrate on which the article is applied. A land portion 65 lies behind second portions 67 and includes material lying beyond the first portion 66. Any filling material used in the first portion itself is not considered a land portion The land portion is typically of the same material as that of filling material 64.

On the top, retroreflective surface 61b of sheet 61 lies an optional top film 70 and an optional protective layer 69 in which skid resistant particles 68 are partially embedded. Preferably, the top film and protective layer are light transmissible, allowing incident light to enter the article and reach the retroreflective elements in the base sheet 61. If desired, the top film and protective coating may have light transmissible colorants to impart color to the inventive article. In another embodiment, the protective layer 69 lies directly on the retroreflective surface 61b.

Aliphatic polyurethanes and aliphatic polyureas are preferred materials for the protective layer and the top film, especially in pavement marking applications because they are light transmissible, resistant to dirt build-up, flexible enough to conform to a road surface, bond to anti-skid particles, and typically do not discolor with exposure to ultraviolet light. In an application on a vertical surface, flexibility may not be as much of a concern and in addition to aliphatic polyurethane, and aliphatic polyurea acrylic, polyester, vinyl, polyethylene copolymer, or alkyd protective layers can be used.

The following cube-corner based retroreflective base sheets are illustrative of those useful for the practice of Applicants' invention. U.S. Pat. No. 5,450,235 (Smith et al.) (hereinafter "Smith '235") discloses a flexible cube-corner base sheet having a body portion and a multitude of cube-corner elements that project from a rear side of the body portion. The body portion includes a cover layer (referred to in the patent as a "body layer") that contains a light-transmissible polymeric material having an elastic modulus less than $7 \times 10^8$ Pascals. The cube-corner elements contain a light-transmissible polymeric material having an elastic modulus greater than $16 \times 10^8$ Pascals. An example of a useful polymer for the cube-corner elements is polycarbonate. The Smith '235 patent also teaches the use of a seal film attached to portions of the cube-corner elements. The seal film maintains an air interface at the backside of the cubes to enhance retroreflectivity. This construction is typically referred to as an encapsulated lens cube-corner base sheet. An "encapsulated-lens cube-corner" base sheet comprises, generally, a body portion having a cover layer and a plurality of cube-corner elements having faces projecting from the base of the cover layer, and a sealing film attached to portions of cube-corner elements' faces to create an air interface between the sealing film and the elements.

The Smith '235 cube-corner sheeting can be made fluorescent as taught in U.S. Pat. No. 5,605,761 (Burns et al.), which discloses the use of a hindered amine light stabilizer to maintain the durability of articles containing fluorescent dyes in a cube-corner polycarbonate polymeric matrix. Sheetings using fluorescent colorants are desirable because they give enhanced visual contrast between the colored sheeting and its surrounding environment. Fluorescent colorants take light in the non-visible spectrum and re-emit it in the visible spectrum. A fluorescent base sheet is particularly useful in vertical applications, such as, for example, on a Jersey barrier.

An embedded cube-corner base sheet typically arises when no seal film is used. The base sheet comprises a body portion having a cover layer and multitude of cube-corner elements that project from the rear side of the body portion. The elements' faces are coated with a specular reflective layer, such as aluminum or silver metal.

U.S. Pat. No. 5,691,846 (Benson Jr. et al.) discloses an ultra-flexible composite sheeting having an array of cured microstructure cube-corner elements bonded to a cover layer (referred to in the patent as an "overlay film"). The sheeting is a described to be durable, flexible sheeting that is useful for the practice of Applicants' invention.

The following microsphere-based base sheets are illustrative of those useful for the practice of Applicants' invention. The base sheets can be either exposed-lens or enclosed-lens. Enclosed-lens base sheet includes encapsulated-lens and embedded-lens sheeting. Illustrative encapsulated-lens sheeting are disclosed in U.S. Pat. No. 4,025,159 (McGrath). An "encapsulated-lens microsphere-based" base sheet comprises a layer of microspheres at least partially embedded in a binder containing specular or diffuse reflecting materials such that the when the binder is allowed to contact the cover layer, an air interface is formed between the cover layer and the exposed portion of the microspheres. An illustrative example of a commercially available encapsulated-lens base sheet well suited for use in this invention is 3M™ Scotchlite™ High Intensity Flexible Work Zone Sheeting Series 3810.

Illustrative embedded-lens sheeting is disclosed in U.S. Pat. No. 4,505,967 (Bailey). An "embedded-lens microsphere-based" base sheet comprises a layer of microspheres having a space layer on the rear surface, a reflective means in optical association with the rear surfaces of the microspheres, and a cover layer in which the front surfaces of the microspheres are embedded. Illustrative examples of commercially available embedded-lens sheeting well suited and preferred for use in this invention include, for example, 3M™ Scotchlite™ Reflective License Plate Sheeting Series 4780; 3M™ Scotchlite™ Engineer Grade Reflective Sheeting Series 3290; and 3M™ Scotchlite™ Flexible Reflective Sheeting Series 580.

The cover layer on microsphere-based and cube-corner based retroreflective base sheets are preferably polymeric and light transmissible, which means they transmit light in the visible spectrum, of about 400 to 700 nanometer wavelength.

If desired, additional materials can be attached to the base sheet's bottom surface. For example, a conformance layer, discussed in detail below, can be attached to the base sheet to impart conformability when the inventive article is applied to a substrate. If a conformance layer is used, it is attached conveniently to the base sheet with a pressure sensitive adhesive. Typically, a base sheet will have with it an adhesive on the bottom surface.

In some applications, a thick inventive product may be required. A thick article, on the order of 0.15 inch (about 4 millimeters) or more, as measured from the top surface of the second portions, may be desirable in applications where the inventive product is attached to a substrate by mechanical means, such as, e.g., bolting, riveting, welding, and the like.

The first portions can have a variety of different shapes and sizes. Typically, for maximum retroreflective effect at high entrance angles, the first portions are preferably oriented at nearly 90°, i.e., perpendicular, to the second portions. Although a nearly perpendicular first portion is typically preferred for retroreflective effect, it may present fabrication challenges in creating cavities with edges perpendicular (i.e., square-like) to the longitudinally extending base sheet. Applicants, however, have fabricated first portions that are nearly perpendicular where the angle between the sides of the first portions and a normal to the second portion located immediately adjacent to the first portion is about 10° to 20°.

The shape of the first portions depends upon, among other factors, the thickness and rigidity of the base sheet. In general, a thin, flexible base sheet will form a square first portion more readily than one that is thick and rigid. For example, the microsphere-based embedded-lens base sheet of Bailey '967 readily forms a nearly perpendicular first portion whereas a cube-corner based base sheet of Smith '235 may not form them as easily. Although the first portion can be formed readily in the Bailey '967 embedded-lens sheeting, Applicants have found that use of a conformance layer, such as a ductile aluminum foil, aids in maintaining the first portion's shape during processing. The conformance layer is particularly beneficial if the base sheet has some elongation properties because, in that case, the ductile, yet sufficiently stiff conformance layer helps to keep the base sheet in the desired position until further processing steps.

Figure 2:
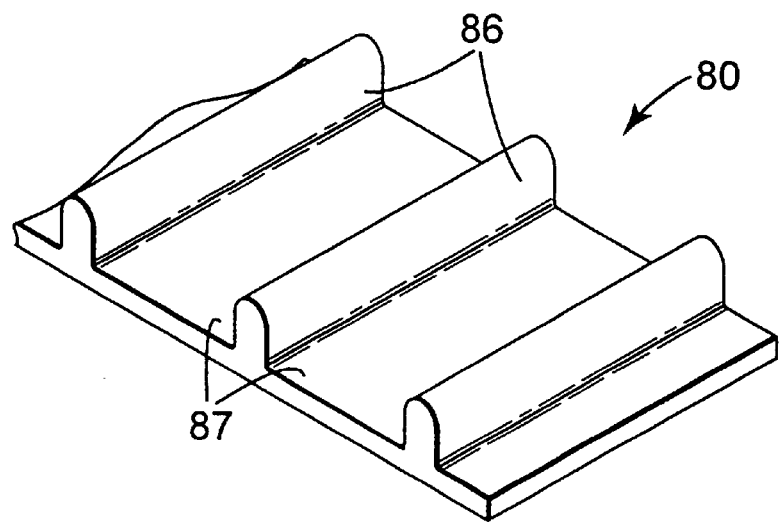
FIG. 2 is a plan view of another illustrative article of the invention.

FIG. 2 illustrates embodiment 80 of the invention having first portions 86 and second portions 87. The first portions are elevated about 0.05 to 10.0 millimeters (0.002 to 0.4 inches) in height above the second portions and are spaced about two 0.5 to 20 inches (about 13 to 500 millimeters). Because a variety of shapes can be used as first portions, one skilled in the art should take into consideration the ease of creating and filling the cavities that corresponds to the first portions, and the shadowing effect of one first portion to the next. In a pavement marking application, one skilled in the art should also take into consideration the effect of repeated impacts of vehicle tires on the first portions. The first portions generally run nearly perpendicular to the direction of traffic. Although FIG. 2 shows a one-dimensional array of first portions, it is within the scope of this invention to have a two-dimensional array. That is, the first portions can intersect one another giving them the appearance of an interconnected mesh from a top view. The first portions may also be in the form of discrete protrusions, such as, for example, discrete dome-shaped regions.

If desired, a conformance layer may be applied to the bottom surface of the base sheet. The conformance layer can impart compliance to the base sheet so as to ease the formation of the first portions and can also add flexibility to the base sheet. Illustrative examples of conformance layer suitable for the practice of Applicants' invention include metal layers of aluminum, silver, and copper. Typically, the metal conformance layers are used as films or foils. An aluminum conformance layer has the advantage in that it is inexpensive and helps to release the base sheet from the ridges during the formation step of the first portions, as discussed further below. The conformance layer can also be a non-woven fibrous web or polymers such as, for example, polyethylene, polypropylene, polyvinyl chloride, and polyurethane. Preferably, the conformance layer is greater than about 0.025 millimeter (0.001 inch) thick.

In some cases when a conformance layer is used, no filling materials will be needed. For example, depending on the thickness and rigidity of the conformance layer, the size, shape, and spacing of the first portions, one skilled in the art can derive a combination of those variables where a first portion can be formed and maintained even when no filling materials are used. In such an embodiment, the inventive article contains a base sheet and a conformance layer having first and second portions. Attachment of such an embodiment to a substrate can be accomplished using an adhesive means or mechanical means. This embodiment would be useful for a vertical surface application but may not be as useful for a pavement marking application because of the repeated impact of vehicle tires.

In addition to, or in place of conformance layers, other materials may be attached to the base sheet's bottom surface to increase the stiffness of the inventive article. In some applications, a stiff article is desirable. For example, a stiff inventive product may be desired for bolting to a concrete barrier.

Figure 3:
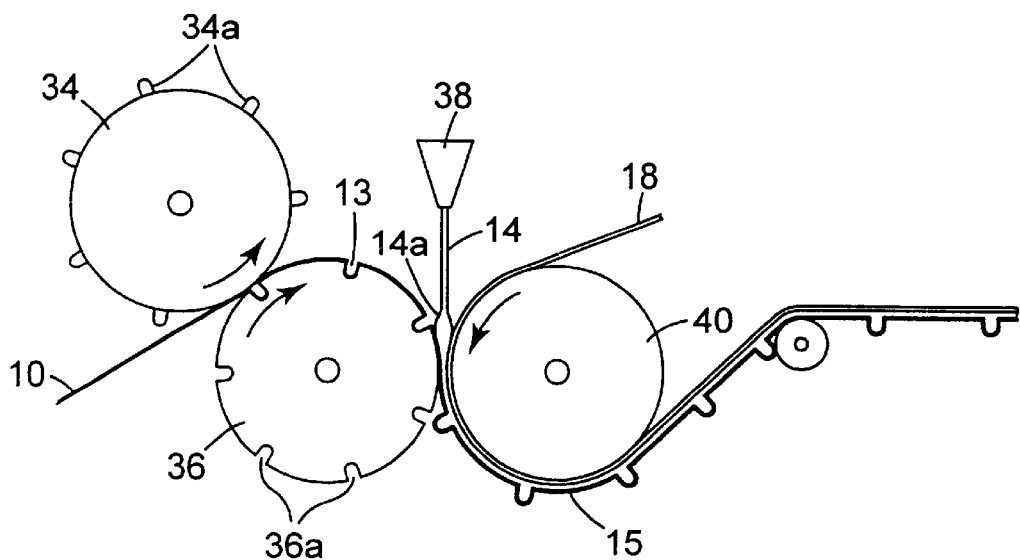
FIGS. 3 and 4 are schematic views of illustrative methods of the invention.

FIG. 3 shows an illustrative inventive method where a retroreflective base sheet 10, having a top retroreflective surface, is fed into a pair of rolls 34 and 36 such that the base sheet's top surface is in contact with roll 36. Roll 34 has a plurality of ridges 34a projecting from its surface. Roll 36 has a plurality of grooves 36a that are negative images of the ridges such that the grooves match the ridges in number, general shape, and spacing. Thus, the grooves 36a are in registration with the ridges 34a so that as the base sheet 10 is fed into the rolls, the base sheet is gathered in the grooves to form cavities 13. Typically, the ridges are smaller than the groves so as to allow the base sheet to be gathered in between the ridges and grooves. The gathering of the base sheet occurs without substantially stretching the base sheet. If any stretching of the base sheet occurs, it is typically less than about 10% of the base sheet's initial length. If desired, the surface of roll 36 can have a series of small holes (not shown) where a vacuum can be pulled to hold the base sheet and cavities in place. A reservoir 38 delivers a filling material 14 in the region between a roll 40 and the roll 36.

Excess filling material is delivered so as to create a rolling bank of filling material 14a. By adjusting the distance between rolls 36 and 40, the pressure roll 40 exerts against the base sheet 10 and roll 36, and the viscosity of the filling material, Applicants are able to control the amount of land (shown as 65 in FIG. 1) lying behind the second portions and beyond the first portions. The land is typically a continuous portion. In some applications, the presence of the land is very useful. For example, when the filling material is an adhesive, it not only fills the cavities but also provides an adhesive layer for direct attachment to a substrate. When mechanical fastening methods are used to attach the inventive article to a substrate, thicker land portions are useful to add strength and rigidity to the article. Optionally, liner 18 is fed into the nip created between rolls 36 and 40 to prevent the filling material from adhering to undesired surfaces. The process yields a profiled and back-filled article 15.

Figure 4:
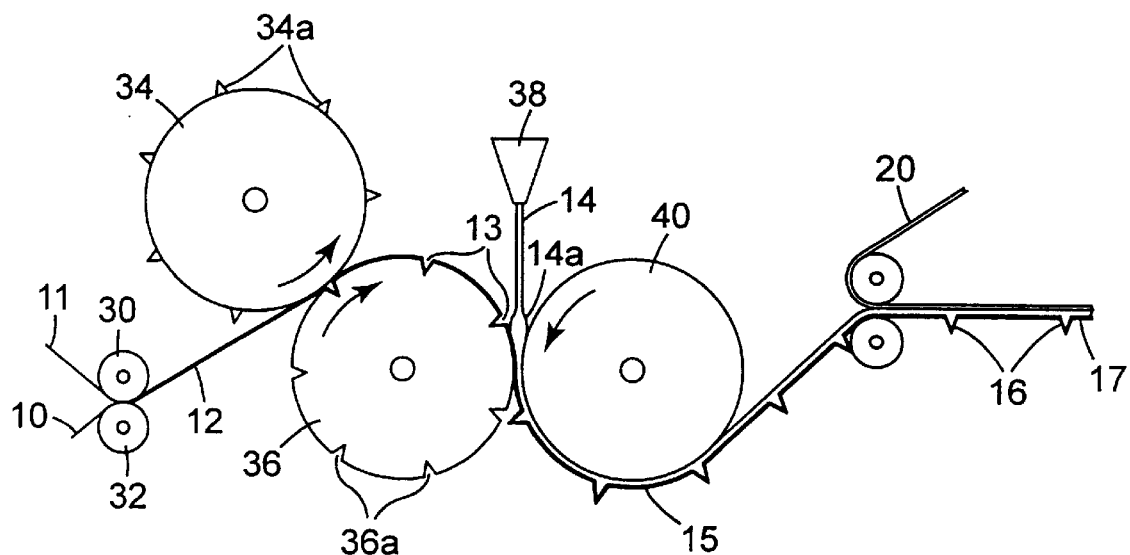

FIG. 4 shows another illustrative method where retroreflective base sheet 10, having a top retroreflective surface and a bottom surface, and conformance layer 11 are laminated together by a pair of rolls 30 and 32 to yield composite 12. The base sheet's bottom surface contains an adhesive layer (not shown) and is exposed to meet conformance layer 11. The lamination process can be done at room temperature or an elevated temperature to increase the adhesion between the reflective sheet and the conformance layer. One skilled in the art, however, will understand the need to avoid excessive heat that may affect the physical and optical properties of base sheet 10 adversely. Physical properties include, but is not limited to, the strength of the sheet, the adhesion between the different layers in a multilayer base sheet, and the flexibility of the base sheet. Optical properties include, for example, the displacement of the reflective layer. In a microsphere-based embedded lens base sheet, the reflective layer behind the microspheres, typically an aluminum specular reflector, may be distorted from its original position if excessive heat and pressure are used during lamination. Such excessive heat exposure may impair the retroreflective performance of the base sheet.

The composite 12 is fed into a pair of rolls 34 and 36 to create cavities corresponding to the first portions. Like numbers in FIGS. 3 and 4 represent like things. The conformance layer of the composite 12 is exposed to the ridges 34a and the base sheet's retroreflective surface is exposed to grooves 36a. As the cavities 13 are created, they necessarily form the first portions on the retroreflective, top surface of composite 12. The cavities are held in place by roll 36, and optionally by vacuum means, so they can be filled with a filling material 14, typically a polymer, delivered through a reservoir 38. In addition to or in place of a vacuum means, mechanical means can be used to hold the base sheet in place.

For example, a nip roll can also be used to exert force on the base sheet. In FIGS. 3 and 4, a nip roll can be placed against roll 36. As the base sheet 10 or a composite 12 enters rolls 34 and 36, they are pulled into the grooves 36a to form cavities. As a formed cavity moves towards roll 40, other cavities are being formed. During this cavity formation process the base sheet or composite gets pulled in various directions along the surface of roll 36. The use of a nip roll placed between a cavity already formed and one in the process of forming isolates the cavities and allows them to maintain their shape.

As in FIG. 3, the quantity of filling material delivered should be sufficient to cover the cavities and typically exceeds such volume thereby creating a land (shown as 65 in FIG. 1). Leaving the roll 40 is the inventive, contour profiled, filled retroreflective sheet 15. In a variation of the above methods, after the cavities are filled, the inventive article 15 remains on roll 36 after leaving roll 40. The article is then removed from roll 36. This method can be advantageous because the filling polymer 14 has additional time to cool and harden before the inventive article is removed from roll 36. Other combinations of entering and leaving the combination of rolls 34, 36, and 40 are within the scope of this invention.

In FIGS. 3 and 4, the reservoir 38 can be an extruder or a coating station designed to deliver a volume of filling polymer 14 into the cavities 13. During this process, some air can be mixed with the filling polymer. It is believed the air does not affect the inventive article's performance, such as, for example, adhesion between the filling polymer and the base sheet. In some instances, air or other gases, such as argon or helium, may be introduced deliberately to create foam thereby reducing the amount of filling polymer used. If desired, rolls 36 and 40 may be chilled to quench the filling material. The rolls 36 and 40 can also be heated for some applications, for example, in formation of the cavities. In FIG. 4, after the cavities are filled with a filling material, the retroreflective sheet 15 can be laminated with an adhesive 20. This latter step is optional and can be done separately.

In general, the types of filling material used should have good adhesion to the material that is on the bottom surface of the base sheet. In some cases, the material may be a sealing film used in forming an encapsulated base sheet. In other cases, the bottom surface of the base sheet may be a conformance layer. The filling material can be extruded or coated into the cavities and are preferably polymers. Illustrative examples of extrudable filling polymers include, for example, thermoplastics and hot melt adhesives. These polymers are processed using conventional extrusion methods well known in the art using extrusion dies. Illustrative examples of coated filling materials include, for example, pressure sensitive adhesives and UV or electron beam curable compositions.

Illustrative examples of extrudable filling materials suitable for the practice of the invention when an aluminum conformance layer is used include polyurethanes, polyesters, polyvinyl chlorides, ethylene vinyl acetate copolymer, polyolefin copolymers such as polyethylene acid copolymer consisting of ethylene methacrylic acid (EMAA), ethylene acrylic acid (EAA), and ionically crosslinked EMAA or EAA. If increased adhesion between the filling material and the conformance layer is desired, one may coat the conformance layer with an adhesion copolymer such as ethylene acrylic acid. For example in FIG. 4, conformance layer 11 may have the surface exposed to roll 30 coated, using conventional coating methods such as gravure coating, with a thin layer (on the order of less than 0.002 inch (0.05 millimeter)) of EAA. This coated surface later receives the filling material, such as polyethylene acrylic acid copolymer, yielding an article that can withstand repeated impacts from vehicle tires. A preferred adhesion copolymer promoter is commercially available from Michelman Incorporated of Cincinnati, Ohio under the product name Michem® Prime 4983R, which is a waterborne dispersion of an ethylene acrylic acid copolymer.

When no conformance layer is used, the filling material should be compatible with whatever material is at the base sheet's bottom, non-reflective surface. Illustrative examples of suitable filling materials when no metal conformance layer is used include, for example, ethylene vinyl acetate (EVA), grafted copolymers based on ethylene propylene diene monomers (EPDM) and styrene acrylonitrile (SAN) forming the AES (acrylic-EPDM-styrene) class of polymers, AES polymers blended with polymers based on polyethylene acrylic acid analogues (ASA), graft copolymers based on styrene, butadiene, and acrylonitrile (ABS), polyvinyl chloride, polyvinylidene chloride, polymers based on pressure sensitive adhesives having isooctylacrylate-acrylic acid (IOA/AA) copolymers, and block copolymers based on polystyrene and polyisoprene or polybutadiene (such as Kraton3 commercially available from the Shell Corporation) either with or without compounding with a terpene or other ester resins.

Another suitable filling material, useful whether or not a conformance layer is used, falls in the class of hot-melt adhesives, which may be thermoplastic or thermoset. Generally, a hot-melt adhesive uses components including solventless polymers and additives such as tackifying resins and plasticizers. The components are processed so as to flow or creep under stress. Typically, they are processed using extrusion methods. U.S. Pat. No. 5,257,491 (Rouyer et al.) discloses a method of packaging an adhesive composition, in particular a thermoplastic or thermoset hot-melt adhesive. Rouyer's hot-melt composition and method of making are useful for the practice of Applicants' invention. When Rouyer's hot-melt adhesive is used in the present invention, it can be extruded directly to the base sheet's bottom surface filling the cavities. Depending on the chemistry of the hot melt adhesive, it may be cured by ultraviolet light or electron beam.

U.S. Pat. Nos. 5,539,033 and 5,550,175 (both Bredahl et al.), disclose solvent-free processes to prepare non-thermosettable pressure sensitive adhesives (PSA) useful for the practice of Applicants' invention. The process uses a continuous, compounding device that has a sequence of alternating conveying and processing zones. The process described allows for processing of non-thermoplastic themoplastic hydrocarbon elastomers and tackifiers, without using organic solvents or low molecular weight plasticizing agents, both of which reduce the viscosity of the composition to render it processable. Bredahl '033 discloses a wide variety of non-thermoplastic hydrocarbon elastomers and tackifiers used in his patent. Examples of the elastomers include natural rubber, butyl rubber, synthetic polyisoprene, ethylene-propylene rubber, ethylene-propylene-diene monomer rubber (EPDM), polybutadine, poly-(alpha-olefin), and styrene-butadiene random copolymer rubber. Examples of useful tackifiers include rosin and rosin derivatives, hydrocarbon tackifier resins, aromatic hydrocarbon resins, and terpene resins, all of which are used from 10 to 200 parts by weight per 100 parts by weight of the elastomer.

In another method, the filling material can be an ultraviolet (UV) light curable polymer resin. For example in FIGS. 3 and 4, the reservoir 38 can be a station supplying an UV curable resin 14 to fill the cavities 13. The resin can be supplied using various coating methods, such as die coating, bar coating, or roll coating. Illustrative examples of UV curable resin suitable for the practice of the invention include methacrylic functional monomers, methacrylic functional oligomers, and combinations thereof. Once the UV curable resin is supplied to the cavities, it can be cured using conventional UV lamps (not shown). The composition of the UV curable resin determines the amount of UV light irradiation and the light intensity needed. Suitable amount of irradiation for the types of resin listed above is about 10 millijoules per square centimeter (mJ/cm$^2$) to 5,000 mJ/cm$^2$. Suitable light intensity is about 50 watts per square centimeter (W/cm$^2$) to 2,000 W/cm$^2$.

Although the method described thus far has focused mainly on creating cavities from the bottom surface of the base sheet, Applicants have found that the top retroreflective surface may also need protection. Extra protection of the inventive article is particularly useful when it is used as a pavement marking and is also useful in vertical applications, such as on jersey barriers, barrels, cones, telephone poles, and the like.

As FIG. 1 shows, on the top retroreflective surface 61b of base sheet 61, there is an optional top film 70, which provides additional protection to base sheet 61. The top film 70 is typically a light-transmissible polymer film of about 0.001 to 0.010 inch (0.025 to 0.25 millimeter) thick, preferably about 0.003 to 0.005 inch (about 0.075 to 0.15 millimeter) thick. The top film 70 is further protected by a protective coating 69.

The protective coating provides abrasion and dirt resistance. It lies on or near the retroreflective surface of the base sheet and is preferably light transmissible. Because the protective coating is typically directly exposed to sunlight, it may contain ultraviolet light absorbers. The coating may also contain other components, such as fungicides and light transmissible colorants. Illustrative examples of a protective coating include, but are not limited to, ceramer coatings and polyurethane coatings. Typically, the protective coating is applied to the base sheet using conventional coating techniques, such as, for example, notch bar coating, spray coating, gravure coating, and knife coating.

As used herein, "ceramer" refers to a solution comprising surface-modified colloidal silica particles dispersed in a free-radically polymerizable organic liquid. Advantages of the coating include the ability to withstand outdoor conditions with excellent resistance to moisture, light and heat; resistance to abrasion; resistance to chemical attack and discoloration by automobile engine oil and carbon black (for example, carbon black of tires); and desirable optical properties such as transparency. In a first step, a ceramer precursor coating composition is applied to the basesheet's retroreflective surface. The coating composition comprises about 20 weight percent (wt %) to about 80 wt % of ethylenically unsaturated monomers; about 10 wt % to about 50 wt % of acrylate functionalized colloidal silica; and about 5 wt % to about 40 wt % of N,N-disubstituted acrylamide monomer or N-substituted-N-vinyl-amide monomer. The percentages are weight percents of the total weight of the ceramer coating composition. The composition is then cured to form a retroreflective article having an abrasion-resistant, light transmissive ceramer coating. The ceramer composition can be applied by any of a number of methods known in the art, including spraying, rolling, dip coating, or knife coating. U.S. Pat. No. 5,677,050 (Bilkadi) discloses the use of a ceramer on pavement markers and retroreflective sheetings.

Polyurethane coatings can be water-based, i.e., substantially solvent free, or solvent based. Polyurethanes generally have good adhesion to anti-skid particles, which are partially embedded in the protective coatings. Preferred urethanes are aliphatic polyurethanes, because they adhere strongly to the base sheet and are resistant to environmental weathering, including dirt build-up and discoloration from exposure to ultraviolet radiation.

An illustrative example of a crosslinked water-based polyurethane protective coating suitable for use in the invention comprises NEOREZ R-960 Brand polyurethane resin crosslinked with Neocryl CX100 Brand crosslinking agent, both available from Zeneca Resins Company. Other water-based systems and crosslinking agents may be used in formulating a protective coating.

An illustrative example of a non-water-based urethane suitable for use in the present invention comprises a polyol mixture, a polyisocyanate, and a catalyst. The polyol mixture is a first component in the polyurethane formulation and preferably comprises polyols and solvents. The polyols contain OH groups and useful polyols include, for example, polycaprolactone triols and unsaturated polyester diols. The polyester diol adds flexibility to the polyurethane protective layer. It also aids in film forming. That is to say, a polyurethane solution containing a sufficient quantity of the polyester diol does not bead up but instead coats out readily to form a film when conventional coating methods, such as notch bar coating and knife coating, are used.

As part of the polyol mixture, the solvents suitable for use in the polyurethane formulation include, for example, acetone and xylene. They make up about 20 weight percent of the polyol mixture. It is believed that the solvents, particularly acetone, prevent the polyols from crystallizing.

A blend of the polycaprolactone triol polyols can be used. Union Carbide Company supplies several commercially available polycaprolactone triols: Tone 301 having a molecular weight of about 300 and Tone 310 having a molecular weight of about 960. Preferably, the blend has an average molecular weight of from about 300 to 600, an average hydroxyl equivalent weight of from about 100 to 220, and an average of about 3 hydroxyl groups per polyol. The lower molecular weight triol imparts rigidity to the polyurethane, whereas the higher molecular weight triol is used to lower the elastic modulus.

The second major component of a non-water-based polyurethane is an isocyanate, which contains NCO groups. Useful isocyanates include isophorone diisocyanate; 4,4'-methylene-bis-cyclohexyl diisocyanate tetramethylene diisocyanate; 1,3 and 1,4 cyclohexyl diisocyanate; 1,6 hexamethylene diisocyanate; isomers of tetramethylxylene diisocyanate. A useful polyisocyanate is isocyanate terminated polymers derived from polyols and difunctional aliphatic isocyanates. A preferred polyisocyanate is an adduct of 1,6 hexamethylene diisocyanate, such as Desmodur N-100 Brand available from Bayer Company, Industrial Coatings Division.

A preferred polyurethane formulation contains an equivalent ratio of NCO groups of the polyisocyanate to the OH groups of the polyol solution from greater than about 1.05. A catalyst is often used to initiate the reaction between the polyol and the polyisocyanate components. A preferred catalyst is dibutyl tin dilaurate. The polyurethane protective layer has approximately about 0.001 inch to 0.005 inch (0.025 to 0.13 millimeters) dry coating thickness. Preferably, the coating is about 0.002 inch (0.05 millimeters) thick to provide sufficient abrasion and dirt resistance, and to adequately hold the skid resistant particles.

The combination of triols and diols in a polyurethane formulation is disclosed in U.S. Pat. No. 5,127,973 (Sengupta et al.) and such a formulation is useful for the practice of Applicants' invention.

Anti-skid particles are a common component of many pavement marking articles to increase the skid resistance of the pavement marker and have been used extensively in the art. They can be placed anywhere on the surface of the article where there is contact with the tires of the vehicles.

Typically, anti-skid particles can be randomly sprinkled on to the protective layer of the retroreflective sheet while it is uncured. For example, the protective layer solution can be coated on to the base sheet's retroreflective surface and prior to the solution drying and curing, the anti-skids particle can be sprinkled to the wet solution. With the weight of gravity aiding the anti-skid particles, they are able to achieve some sinking into the uncured coating. As the coating cures, the anti-skid particles become partially embedded into the protective layer.

Retroreflective articles of the present invention may be used advantageously in a number of different applications, particularly in wet conditions and where light is incident at high entrance angles. The articles are well suited for use as a pavement marking or horizontal sign. Because of their high retroreflectivity at both high and low entrance angles, the articles are also well-suited for vertical applications, such as use on Jersey barricades or guard rails; for curved surfaces applications such as traffic barrels, tubes, and cones; for vehicle surfaces; and for other applications where the exceptional effective entrance angularity of the article will be advantageous. For example, many embodiments of sheeting of the invention can provide effective retroreflection over nearly all entrance angles. As a result, when the sheeting is wrapped around an object such as a telephone pole or barrel, the entire surface of the sheeting that is within a motorist's line of sight can provide effective retroreflection including portions on the surface of the article that are curving away from the observer. This ability increases the effective retroreflective area, providing a more visible marking and thereby enhancing safety. In addition, a single marking such as a stripe on a guard rail, Jersey barrier, or wall that is parallel to a first road and perpendicular to a second road that intersects the first road on the opposite side of the first road from the second road can provide very bright and effective retroreflective response visible to drivers of vehicles on both the first and second roads.

Another advantage of the present invention is that the retroreflective article is visible from any direction, as the reflectivity is high regardless of the direction of approach of the viewer to the article. This omni-directional feature makes the invention particularly well suited for horizontal signing applications, intersection markings, etc. where vehicles may approach from a number of angles.

The ease of coloring this sheeting also makes it particularly useful for horizontal signs. Transparent color layers may be applied onto the sheeting in a graphic pattern so that the retroreflected light has nearly the same coloration and pattern as is seen in a daytime viewing. It is especially useful if the ink is applied beneath the protective layer so as to be protected from road abrasion. This feature is particularly important as commonly used inks are thin, and can thus be quickly worn away by road traffic if left exposed.

Material of the invention may be wound upon itself into a roll form. The projections made by the first are not substantial enough to interfere with wind-up.

EXAMPLES

The invention will be further explained by the following illustrative examples, which are intended to be non-limiting.

Example 1

A 3M™ Scotchlite™ Preclear Reflective License Plate Sheeting Series 4780A retroreflective base sheet, available from Minnesota Mining and Manufacturing, St. Paul, Minn., was laminated to a 0.003 inch (0.076 millimeter) 1100-0 aluminum foil from A. J. Oster Company using conventional squeeze roll lamination techniques at room temperature to yield a composite. The composite sheeting was directed into a forming-backfilling apparatus, which comprised a pair of rolls to gather the composite without substantially elongating it. Roll 1 had a plurality of ridges extending from its surface. Roll 2 had a plurality of grooves that matched in number, spacing, and general shape of the ridges. Referring to FIG. 3 for illustrative purposes, Rolls 1 and 2 in this example correspond to roll 34 and 36 respectively in the figure.

The composite was fed into the apparatus with the base sheet retroreflective surface in direct contact with Roll 2 containing grooves and the aluminum foil side contacting Roll 1 containing the ridges. The grooves and ridges gather the composite and create cavities therein. The line was run at 10 feet per minute (about 3 meters per minute). Holes were drilled in the areas between the grooves of Roll 2, and a compound vacuum pump from Kinney Vacuum Company under product name Kinney Tri-Star model number KTC 112 was used to draw air through the holes creating a vacuum to hold the base sheet flat against Roll 2.

After the cavities were formed, extruded resin was fed between Roll 2 and a third roll, labeled as Roll 3, to fill the cavities forming corresponding first portions. Excess extruded resin in the gap between Rolls 2 and 3 formed a rolling bank of extruded resin. The extruded filling polymer used is commercially available from Dow Chemical Company under the product name Primacor 5980, which is an ethylene acrylic acid copolymer (EAA). The extrusion temperatures resulted in a melt temperature of about 400° F. This resin was picked because it has good adhesion to metals such as aluminum. After forming the cavities and filling them, a polyester carrier film was fed into the nip created between Rolls 2 and 3. The polyester film was allowed to contact the surface of Roll 3 and serves primarily to prevent the filling material to from adhering to the surface of Roll 3. Roll 3 was chilled with cooling water to help solidify the filling polymer. Referring again to FIG. 3 for illustrative purposes, Roll 3 in this example correspond to roll 40 in the figure.

Example 2

A 3M™ Scotchlite™ Flexible Reflective Sheeting Series 580 (an embedded-lens base sheet having a retroreflective top surface and a bottom surface) with its adhesive located on the bottom exposed, was laminated to a 0.075 millimeter aluminum foil conformance layer. The lamination occurred at room temperature using a conventional squeeze roll lamination process to yield a composite. The base sheet 580 is commercially available from Minnesota Mining and Manufacturing (3M) Company, located in St. Paul, Minn., USA. The aluminum foil is commercially available from Toyo Aluminum Co., Ltd., located in Japan under the product number A1N30 H-O.

On the bottom surface of the base sheet, cavities, in the form of discrete protrusions were created. These cavities correspond to first portions on the top surface of the 580 base sheet. An ultraviolet (UV) curable resin was coated into the cavities using conventional coating techniques, such as die coating. There was enough UV curable resin to fill at least the cavities. The resin was cured using a metal halide UV lamp commercially available from Eye Graphics Co., Ltd., under the product number ECS-151U. The amount of irradiation used was about 600 millijoules per square centimeter at an intensity of about 850 watts per square centimeter. The height of the first portions was about 2 millimeters, as measured from the top surface of the base sheet at the second portions. The first portions were discrete spaced about 10 millimeters apart from one another.

What is claimed is:

1. A method for making a retroreflective material comprising:
    (a) providing a substantially continuous, longitudinally extending retroreflective base sheet comprising a cover layer and a plurality of retroreflective elements, said base sheet having a retroreflective top surface and a bottom surface;
    (b) creating a plurality of cavities on said bottom surface of said base sheet without substantially stretching it to yield (i) first portions extending generally perpendicular to the base sheet, said first portions having retroreflective elements arranged in an upwardly contoured profile and (ii) second portions having retroreflective elements arranged in a substantially planar position; and
    (c) applying a filling material into said cavities to retain in place said first portions.

2. The method of claim 1, wherein said cavities are created by a gathering method comprising:
   (a) feeding said base sheet into an assembly having a first roll containing on its surface a multiplicity of ridges and a second roll containing on its surface a multiplicity of grooves, said ridges and grooves matching in number, general shape, and spacing; and
   (b) holding the cavities in place by using at least one means selected from the group consisting of vacuum means and mechanical means.

3. The method of claim 2 wherein said mechanical means used to hold said cavities in place comprises a nip roll positioned against said second roll such that said nip roll isolates a cavity in the process of being formed from the cavities already formed.

4. The method of claim 2 wherein said gathering method creates a single cavity at a time across substantially the entire width of said base sheet.

5. The method of claim 1 wherein said filling material is adhered to bottom surface of said base sheet.

6. The method of claim 1 wherein said cavities are filled with a polymer selected from one of the group consisting of pressure sensitive adhesive and hot melt adhesive.

7. The method of claim 1 wherein said first portions are elevated about 0.05 to 10 millimeters above said second portions.

8. The method of claim 1 wherein said base sheet further comprises, on its top surface, at least one of the following: a light transmissible protective layer, a light transmissible top film, and anti-skid particles partially embedded in said protective layer or in said top film.

9. The method of claim 1 wherein said base sheet is selected from one of the group consisting of cube-corner based embedded lens, cube-corner based encapsulated lens, microsphere based embedded-lens, and microsphere based encapsulated lens.

10. The method of claim 1 wherein the first portions are in the form of one of the following: strips, interconnected strips, and protrusions.

11. The method of claim 1 further comprising applying a conformance layer to the bottom surface of said base sheet to yield a composite sheet before creating cavities in said base sheet.

12. The method of claim 11 wherein said conformance layer is a ductile aluminum foil.

13. The method of claim 12 wherein said cavities are filled with a polymer selected from the group consisting of extruded polymer and ultraviolet light curable polymer.

14. The method of claim 13, wherein said extruded polymer is selected from the group consisting of polyurethanes, polyolefin copolymers and polyethylene acid copolymer consisting of ethylene methacrylic acid (EMAA), ethylene acrylic acid (EAA), and ionically crosslinked EMAA or EAA.

15. The method of claim 13, wherein said ultraviolet light curable polymer is selected from the group consisting of methacrylic functional monomers, methacrylic functional oligomers, and combinations thereof.

16. The method of claim 15, wherein said ultraviolet curable polymer is cured using a ultraviolet lamp with an irradiation in the range of about 10 to 5,000 millijoules per square centimeter and with an intensity of about 50 to 2,000 watts per square centimeter.

17. The method of claim 1 wherein said filling material is applied in excess of the volume of the cavities to create a land portion behind said second portion of said base sheet and beyond the first portions of said base sheet.

* * * * *

UNITED STATES PATENT AND TRADEMARK OFFICE
CERTIFICATE OF CORRECTION

PATENT NO. : 6,303,058 B1
DATED : October 16, 2001
INVENTOR(S) : Kelley, Michele H.

It is certified that error appears in the above-identified patent and that said Letters Patent is hereby corrected as shown below:

Title Page,
Item [56], FOREIGN PATENT DOCUMENTS, delete "0541624 3/1979 (GB) G09F/13/16" and insert -- 1 541 624 03/07/79 (GB) G09F/13/16 --.
Item [57], ABSTRACT,
Line 5, following "arranged" and before "a" insert -- in --.

Column 3,
Line 50, following "substrate" and before "the" insert -- to which --.
Line 64, following "section" and before "an" insert -- of --.

Column 5,
Line 26, following "is" and before "described" delete "a" .

Column 9,
Line 57, delete "Kraton3" and insert in place thereof -- Kraton® --.

Column 10,
Lines 17 and 18, following "non-thermoplastic" and before "hydrocarbon" delete "the-mo plastic"

Column 14,
Line 15, following "material" and before "from" delete "to".

UNITED STATES PATENT AND TRADEMARK OFFICE
CERTIFICATE OF CORRECTION

PATENT NO. : 6,303,058 B1
DATED : October 16, 2001
INVENTOR(S) : Kelley, Michele H.

It is certified that error appears in the above-identified patent and that said Letters Patent is hereby corrected as shown below:

<u>Column 16,</u>
Line 16, delete "and" and insert in place thereof -- such as --.
Line 25, delete "a" and insert in place thereof -- an --.

Signed and Sealed this

Twenty-fifth Day of March, 2003

JAMES E. ROGAN
*Director of the United States Patent and Trademark Office*